United States Patent [19]

Vedova et al.

[11] 4,311,313

[45] Jan. 19, 1982

[54] CLEARANCE SEALING ARRANGEMENT FOR JET THRUST DEFLECTION EQUIPMENT

[75] Inventors: Ralph Vedova, Munich; Alfred Jabs, Gröbenzell, both of Fed. Rep. of Germany

[73] Assignee: MTU Motoren-und Turbinen-Union Munchen GmbH, Munich, Fed. Rep. of Germany

[21] Appl. No.: 206,423

[22] Filed: Nov. 13, 1980

[30] Foreign Application Priority Data

Nov. 16, 1979 [DE] Fed. Rep. of Germany ....... 2946324

[51] Int. Cl.³ ............................................. F16J 15/16
[52] U.S. Cl. ......................................... 277/27; 277/30; 277/193; 277/199; 285/268
[58] Field of Search .................... 285/DIG. 1, 95, 261, 285/266, 267, 268; 277/30, 192, 193, 199, 27

[56] References Cited

U.S. PATENT DOCUMENTS

| | | | |
|---|---|---|---|
| 1,434,631 | 11/1922 | Reynolds | 285/268 |
| 2,043,562 | 6/1936 | Tailleferre | 285/266 |
| 3,007,720 | 11/1961 | Breitenstein | 285/268 |
| 3,295,857 | 1/1967 | Lutz | 277/199 |
| 3,305,241 | 2/1967 | Hart | 277/199 |
| 3,606,349 | 9/1971 | Petrie et al. | 277/27 |
| 3,961,815 | 6/1976 | Coulboy et al. | 285/267 |
| 4,050,702 | 9/1977 | Del Matto | 277/199 |
| 4,087,323 | 5/1978 | Sullivan | 285/268 |
| 4,185,837 | 1/1980 | Greene | 277/30 |
| 4,191,387 | 5/1980 | Kirchoff | 277/30 |

*Primary Examiner*—Robert I. Smith
*Attorney, Agent, or Firm*—Alan H. Levine

[57] ABSTRACT

A sealing arrangement for sealing the clearance between the outlet end of a rigidly mounted jet pipe and the inlet end of another pipe tiltable three-dimensionally with respect to the rigidly mounted pipe, one of the pipes being formed with a ball socket-like surface. A ring shaped seal support is mounted on the pipe not having the ball socket-like surface. A sealing ring in the support is formed of segments which overlap one another in the circumferential and axial directions, the sealing ring protruding from the support toward the ball socket-like surface. A corrugated flat spring is located between the sealing ring and the base of the seal support to urge the sealing ring toward the ball socket-like surface. The sealing ring is pressed against the ball socket-like surface and one wall of the support by pressure in the pipes when the engine is running, and that wall of the support is provided with pressure equalizing pockets.

5 Claims, 6 Drawing Figures

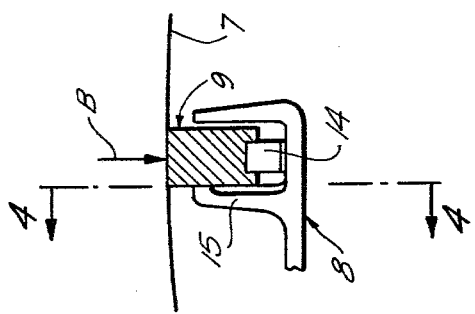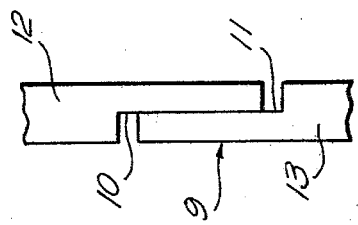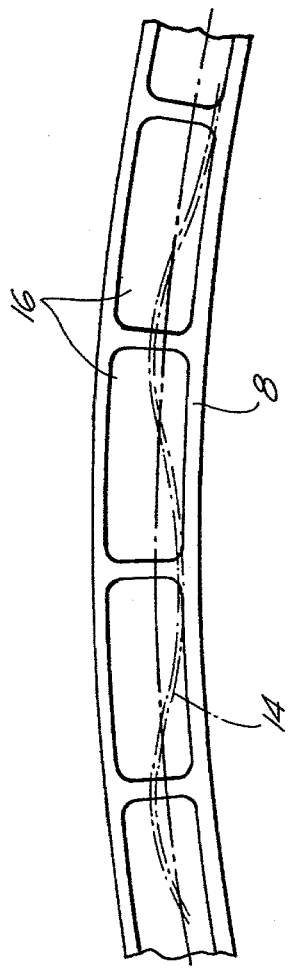

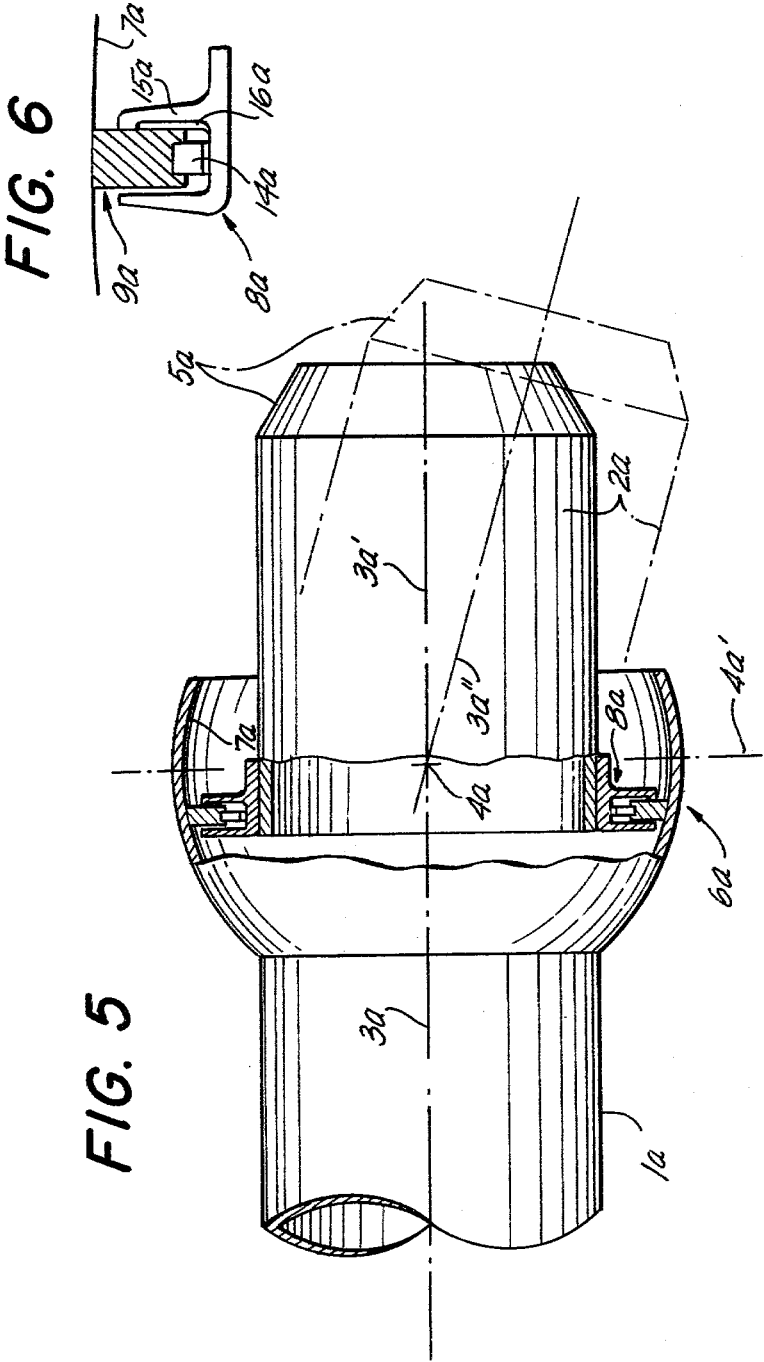

CLEARANCE SEALING ARRANGEMENT FOR JET THRUST DEFLECTION EQUIPMENT

The invention relates to an arrangement for sealing the clearance between the outlet end of a rigidly mounted jet pipe and a ball socket-like inner surface at the inlet end of a further section of pipe. The further section of pipe is arranged on the rigidly mounted section of pipe so that it can be tilted three dimensionally about a common axial midpoint of the pipes, for the purpose of deflecting a thrust jet, especially for deflecting the reheated exhaust gas of a jet engine.

It is possible to use jet-deflecting equipment of the aforementioned type, inter alia, either for horizontal or high-speed flight of an airplane, as well as for achieving various steering maneuvers of an airplane, which should be carried out as rapidly as possible.

Moreover, in order to increase the engine thrust, the jet deflection arrangement may be provided with an exhaust reheater. In this case, an adjustable thrust nozzle on the gas outlet side is associated, as a rule, with the section of the pipe which can be tilted three dimensionally, and which is also referred to as a "tilting jet". The seal required for the jet deflecting arrangement, which is appropriate for the inlet, can be described as a "critical" component, because the following, inter alia, depend on its mode of action:

the operational safety of the jet deflecting arrangement;
friction, as the section of pipe equipped with the thrust jet is tilted;
thrust losses through leakage; and
heating of the aircraft frame near the tiltable section of pipe which is equipped with the thrust jet.

Because of the geometry of the motion of this section of the pipe, the seal housing at the tiltable section of pipe must have an inner contour including a spherically shaped zone. In operation, however, the clearance which is to be sealed between the end of the rigidly mounted jet pipe and the moveable ball socket does assume an excentrically displaced, nonspherical shape because of:

manufacturing inaccuracies caused by:
variations in dimensions,
variations in shape, and
inaccuracies in assembly and installation;
deformations through
pulsating and inertial forces as the aircraft banks, and nonuniform thermal expansions.

Larger shape distortions are to be expected primarily in the case of a thin-walled ball socket on the tiltable section of pipe.

It is an object of the invention to provide a clearance sealing arrangement, which functions optimally with regard to the preceding requirements.

In order to accomplish this objective, the equipment of the aforementioned type is provided with a ring-shaped seal support opening toward the ball socket surface, a sealing ring formed of overlapped segments in the seal support, a spring for maintaining the sealing ring in place when the engine is off, the sealing ring being pressed against the ball socket surface by pressure in the pipe when the engine is on, and pressure-equalizing pockets in the seal support.

By way of example, the invention is illustrated further by means of the drawings, in which:

FIG. 2 is a longitudinal cross-sectional view of a support for a seal, in addition to the sealing ring and a ball socket-shaped section facing the latter;

FIG. 3 is a view looking in the direction of arrow B in FIG. 2 showing two mutually overlapping segment sections;

FIG. 4 is a cross-sectional view taken along line 4—4 of FIG. 2 showing a shoulder section of the support for the seal;

FIG. 5 is a view, similar to FIG. 1, of a second version of a jet deflecting arrangement including a rigidly mounted section of pipe linked to a section of pipe which can be tilted three dimensionally; and FIG. 6 is a longitudinal cross-sectional view of a support for a seal which is functionally matched to the second version of the jet deflecting arrangement of FIG. 5.

Figure 1:
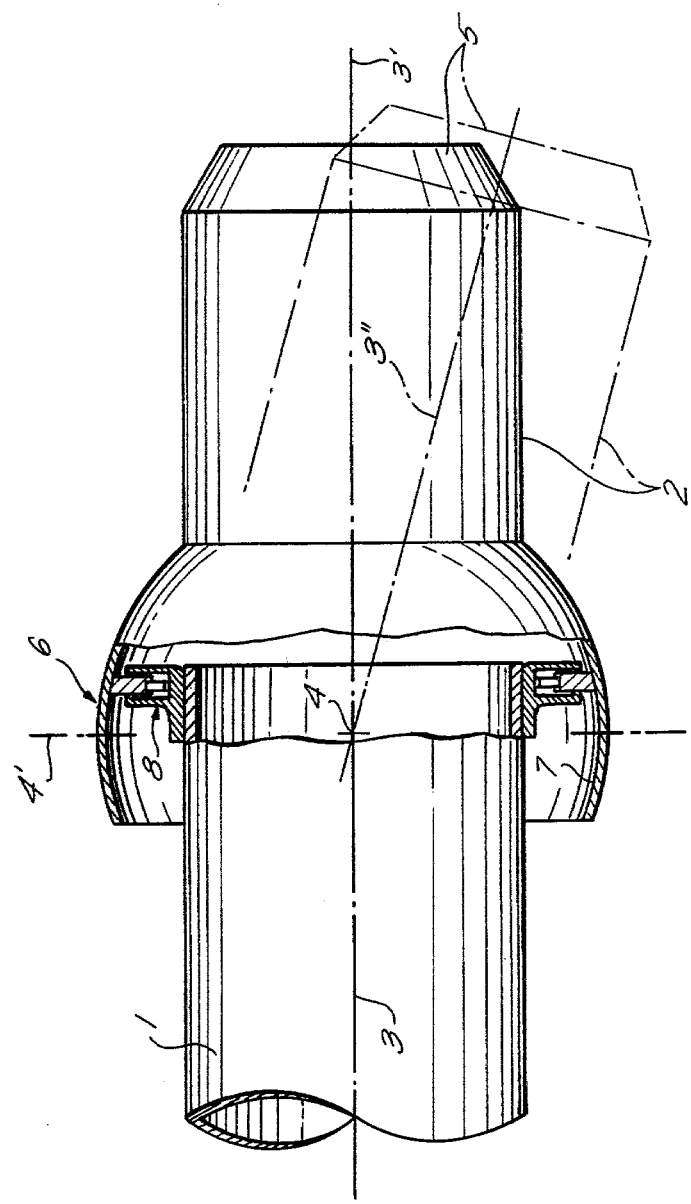
FIG. 1 is a side elevational view partially broken away and in section, of a jet deflecting arrangement including a rigidly mounted section of pipe linked with a further section of pipe which can tilt three dimensionally.

The jet deflecting arrangement of FIG. 1 consists of a rigidly mounted jet pipe 1, to which a further section of pipe 2 is tiltably connected. Pipe 2 is tiltable with respect to pipe 1 either about a horizontal axis of rotation 4, which intersects the longitudinal axis 3 of the rigidly mounted jet pipe 1 at right angles, or about a vertical axis of rotation 4', which passes through the point of intersection of the axes 3 and 4. Pipe section 2 may be tilted three dimensionally about these two axes of rotation 4 and 4'.

In the elongated condition of the jet deflecting arrangement for horizontal and high-speed flight, shown in full lines in FIG. 1, the longitudinal axis 3' of pipe section 2 is colinear with longitudinal axis 3 of the rigidly mounted pipe section 1. The position of pipe section 2, represented by dashed lines, as well as the corresponding longitudinal axis (indicated at 3") characterize a position in which the exhaust jet of a turbine engine is deflected downwards towards the rear relative to a horizontal flight position.

At the downstream end, the additional pipe section 2 has an adjustable thrust nozzle 5. In the region of the transition between the rigidly mounted pipe section 1 and the additional pipe section 2, there is a ball socket-shaped expanded component 6 which is attached to the inlet side of the additional pipe section 2, or is a common component of the pipe section 2.

In accordance with the invention, provided at the outlet end of the rigidly mounted jet pipe 1 is a ring-shaped support 8 for a seal. The support is mounted coaxially with the longitudinal axis 3 of jet pipe 1, and opens towards the ball socket-like inner surface 7 of the ball socket-shaped component 6. A sealing ring 9 is arranged within seal support 8 (see also FIG. 2) with a specified axial as well as radial play. The sealing ring 9 is composed of segments 12 and 13 (FIG. 3), which mutually overlap in the circumferential direction, as well as at the radial contacting surfaces 10 and 11, and protrudes out of the upper opening of the seal carrier 8. When the engine is switched off, the sealing ring 9 is kept in its position by a flat keep spring 14. The spring is uniformly corrugated in the circumferential direction and alternately is tangent to the sealing ring 9 and to the base of the seal support 8 (FIG. 4). With the engine switched on, segments 12 and 13 of the sealing ring 9, as a consequence of the internal pressure in the pipe, are pressed against the ball socket-like inner surface 7 as well as against the inner wall of the front and left (in FIG. 2) bearing shoulder 15 of the seal support 8. Moreover, as shown in FIG. 4, pressure equalizing pockets 16 are inserted or formed in the inner wall of the front bearing shoulder 15 of the seal carrier 8, so that during radial motion of the segments 12 and 13, friction due to the axial force is reduced.

The segments 12 and 13 of the sealing ring 9 may be made from a sintered material or from graphite.

As a result of the high lateral shoulders of the ring-shaped guide groove of the seal carrier 8, and the relatively large radial play of the sealing ring 9, segments 12 and 13 can experience radial movements of ±3 mm about a theoritical zero position. As a result, the sealing ring is able to safely bridge variations in shape and dimensions as well as excentricities and deformations, even taking into consideration variations in the dimensions of the sealing ring.

Moreover, since the radial force is significantly larger than the frictional force inhibiting radial motion, the sealing ring can be expected to lie securely against the ball socket surface under operating conditions. Concomitantly, as a result of the large axial force, it may be assumed with safety that the ring will lie tightly against the bearing shoulder 15, even when the pipe section 2, which is provided with the adjustable thrust nozzle 5, is tilted. Furthermore, care should be taken to ensure that the surfaces (ball socket-like inner surface/sealing ring and segments) are smooth in order to avoid friction when the pipe section 2 is tilted.

In accordance with FIGS. 5 and 6, the objectives of the invention can also be obtained in the case of a jet deflecting arrangement. In this case, a ball socket-shaped expanded component 6a is arranged at the outlet end of the rigidly mounted jet pipe 1a, while at the inlet end of the tiltable section of pipe 2a a ring-shaped seal support 8a is provided. The seal support is arranged coaxially with the longitudinal axis 3a' of the tiltable pipe section 2a and which is open towards the ball socket-like inner surface 7a of component 6a. A sealing ring 9a is inserted in this seal support 8a (see also FIG. 6) with provisions for axial as well as radial play. Sealing ring 9a is composed of segments which mutually overlap in the circumferential direction as well as at the radial contacting surfaces, and protrudes from the upper opening of the seal support 8a. With the engine switched off, the sealing ring 9a is maintained in its position by a flat keep spring 14a (FIG. 6), which is uniformly corrugated in the circumferential direction and which is tangent alternately to the sealing ring 9a as well as to the base of the seal support. With the engine switched on, the segments of the sealing ring 9a, as a consequence of the internal pressure in the pipe, are pressed against the ball socket-like inner surface 7a as well as against the inner wall of the rear or right (in FIG. 6) supporting shoulder 15a of the seal support 8a. Moreover, pressure equalizing pockets 16a are inserted or formed in the inner wall of the rear supporting shoulder 15a of the seal support 8a, in order, during radial motion of the segments of the sealing ring 9a, to reduce the friction originating from the axial force.

In the extended position of the jet deflecting arrangement shown for horizontal and high-speed flights, the longitudinal axis 3a' of the section of pipe 2a is colinear with the longitudinal axis 3a of the rigidly mounted pipe section 1a.

The position of pipe section 2a, represented by dashed lines, as well as the corresponding longitudinal axis (indicated at 3a'') characterize a position in which the exhaust jet of a turbine engine, with reference to a horizontal flight attitude, is deflected towards the rear and downwards, by virtue of the fact that the section of pipe 2a has been tilted about the horizontal axis of rotation 4a.

At the downstream end, the additional section of pipe 2a has an adjustable thrust nozzle 5a. The vertical axis of rotation for the section of pipe 2a is labelled 4a' in FIG. 5.

The mode of operation, which explains the object of the invention in detail and which was already given for the embodiment of FIGS. 1 to 4, applies also to FIGS. 5 and 6.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

We claim:

1. A sealing arrangement for sealing the clearance between the outlet end of a rigidly mounted jet pipe and another pipe section tiltable three-dimensionally with respect to the rigidly mounted pipe, the two pipes being interconnected by a formation on one of the pipes having a ball socket-like inner surface, the sealing arrangement comprising:
   (a) a ring-shaped seal support on the pipe not having the ball socket-like formation, the seal support being coaxial with its respective pipe, and the seal support opening toward the ball socket-like inner surface and having a base opposite the opening,
   (b) a sealing ring accommodated within the seal support so as to be movable axially and radially therein, the sealing ring being formed of segments which overlap one another in the circumferential and axial directions, and the sealing ring protruding from the opening in the seal support,
   (c) a flat spring between the sealing ring and seal support base, the spring being corrugated in the circumferential direction and being tangent alternately to the seal support base and to the sealing ring,
   (d) internal pressure in the pipes, when the jet engine is running, pressing the segments of the sealing ring against both the ball socket-like inner surface and a wall of the seal support, and
   (e) pressure equalizing pockets in the wall of the seal support against which the seal is pressed.

2. A sealing arrangement as defined in claim 1 wherein the ball socket-like surface is at the outlet end of the rigidly mounted pipe and the seal support is mounted on the inlet end of the tiltable pipe.

3. A sealing arrangement as defined in claim 2 wherein the pressure in the pipes presses the seal against the downstream wall of the seal support, and the downstream wall is formed with pressure equalizing pockets.

4. A sealing arrangement as defined in claim 1 wherein the ball socket-like surface is at the inlet end of the tiltable pipe and the seal support is mounted on the outlet end of the rigidly mounted pipe.

5. A sealing arrangement as defined in claim 4 wherein the pressure in the pipes presses the seal against the upstream wall of the seal support, and the upstream wall is formed with pressure equalizing pockets.

* * * * *